INVENTORS
ARTHUR E. BUMPUS JR.
FRANK J. STAVISH
RICHARD A. WEINBERG

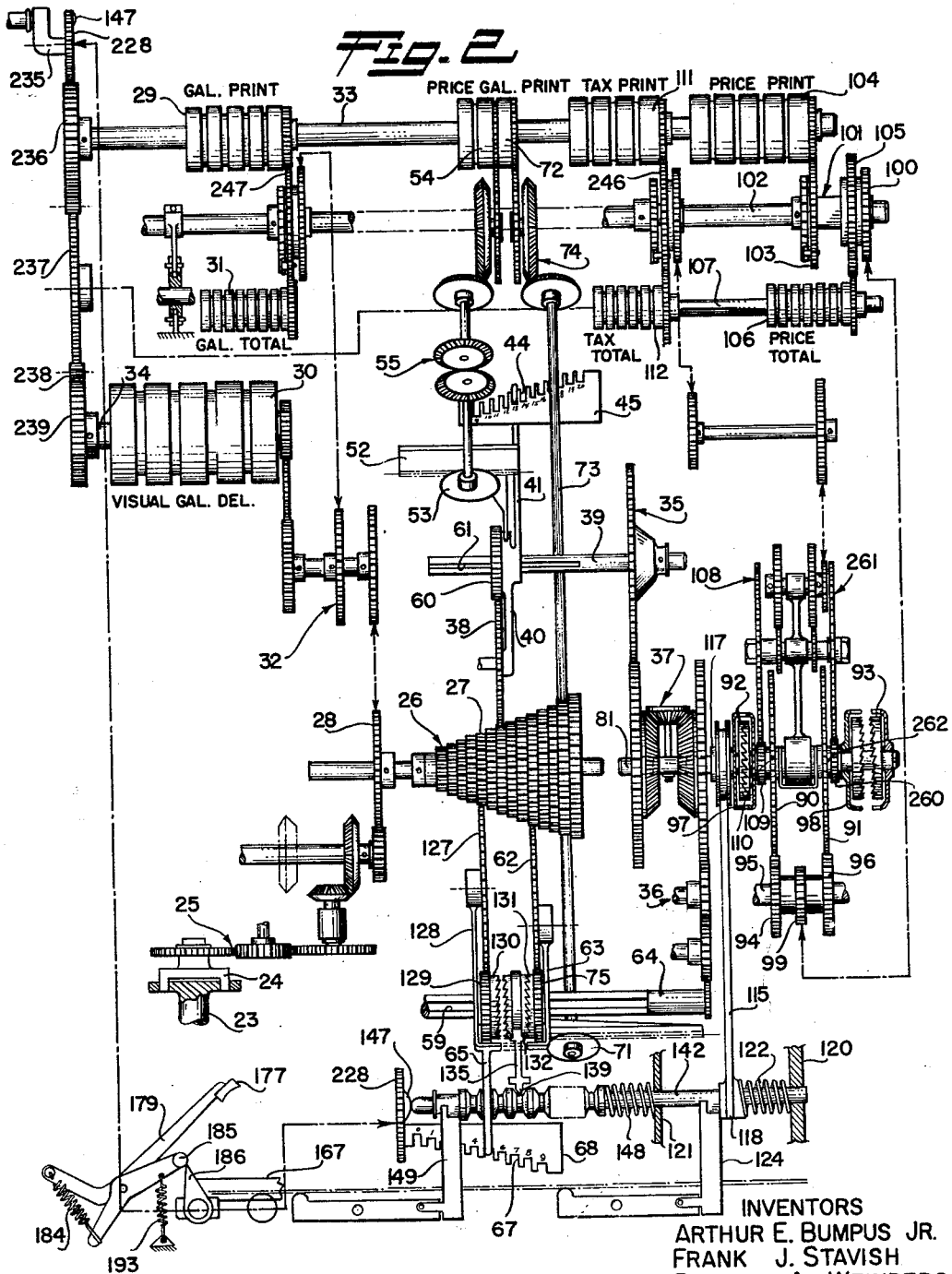

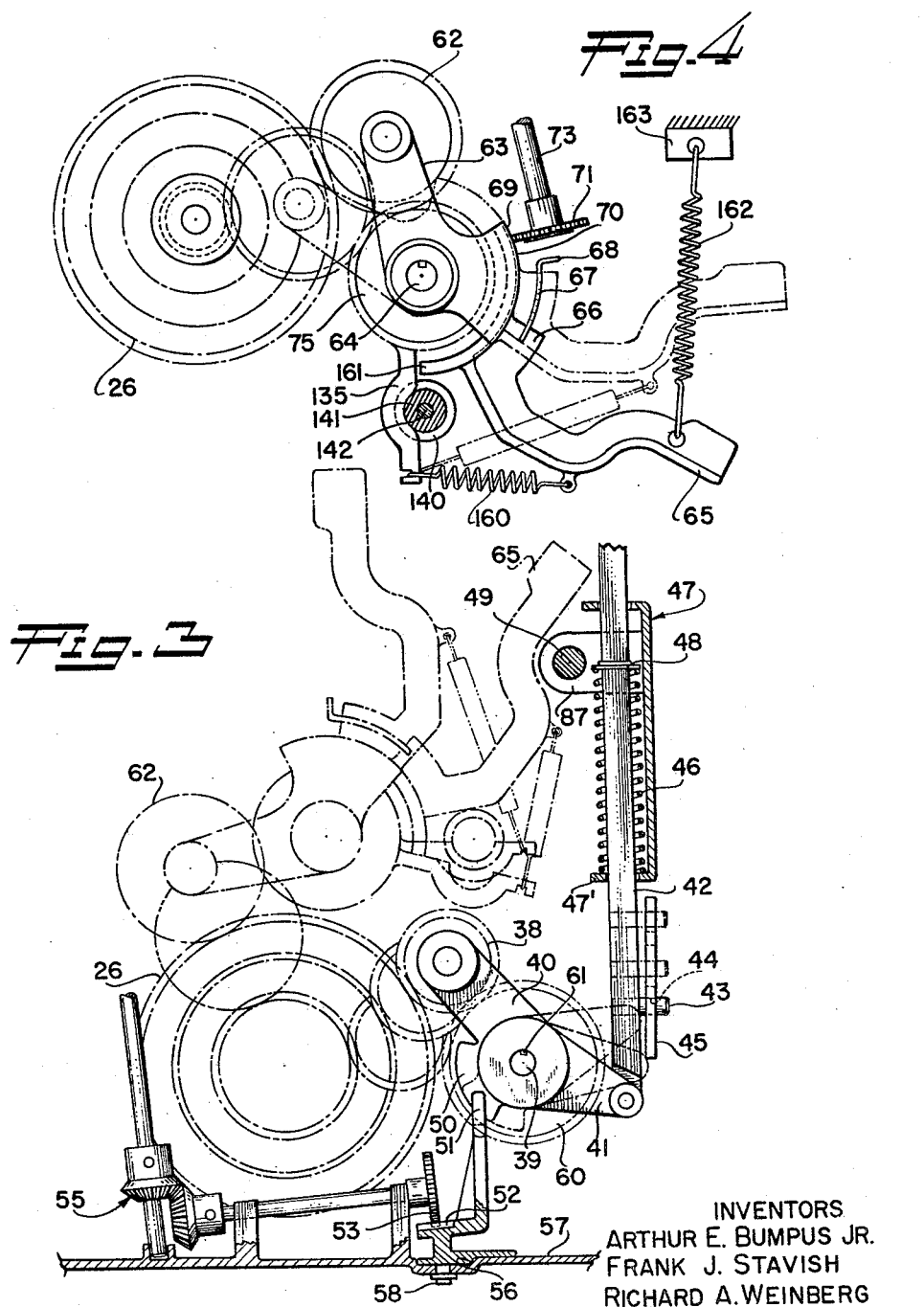

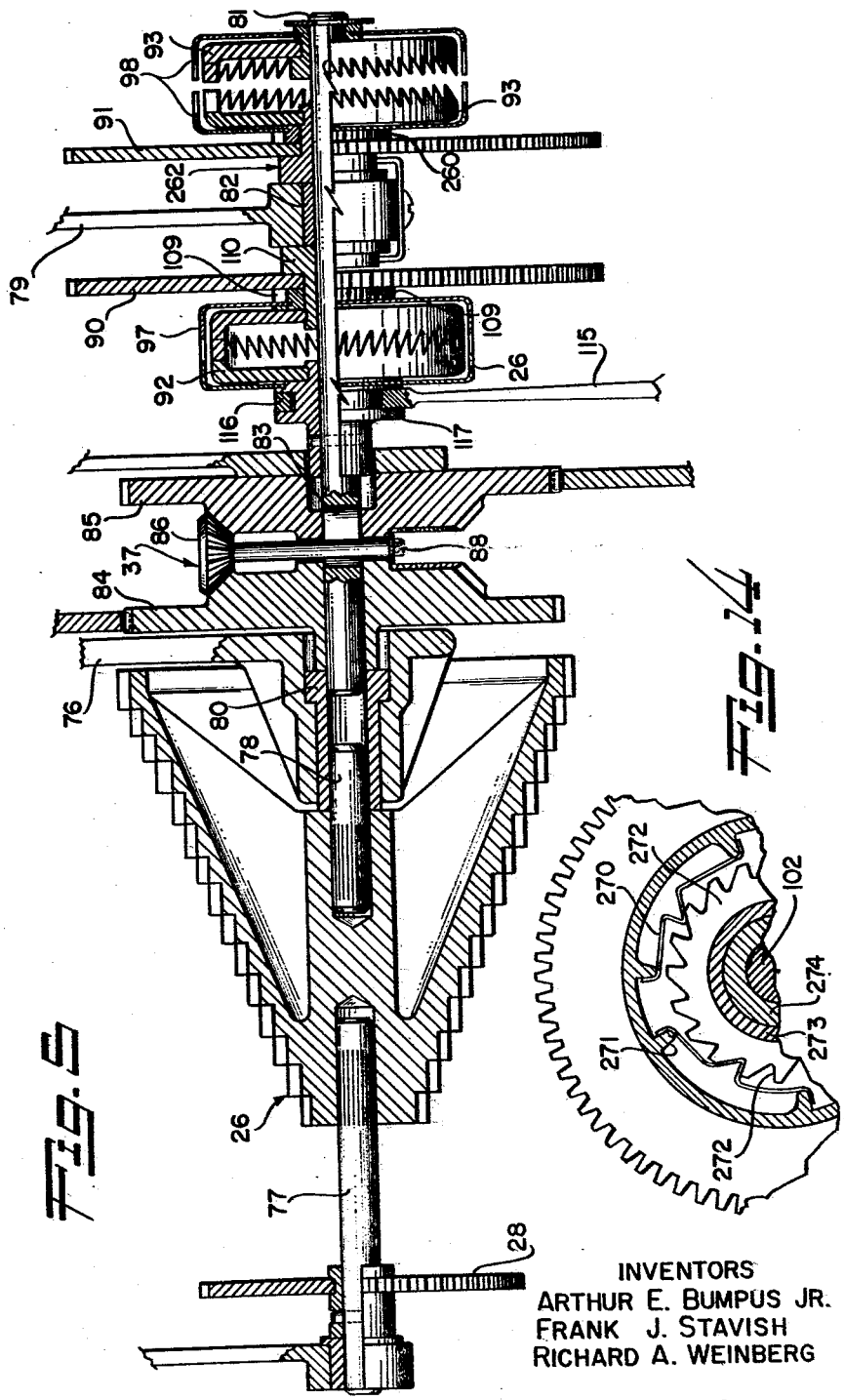

INVENTORS
ARTHUR E. BUMPUS JR.
FRANK J. STAVISH
RICHARD A. WEINBERG

By

Agent

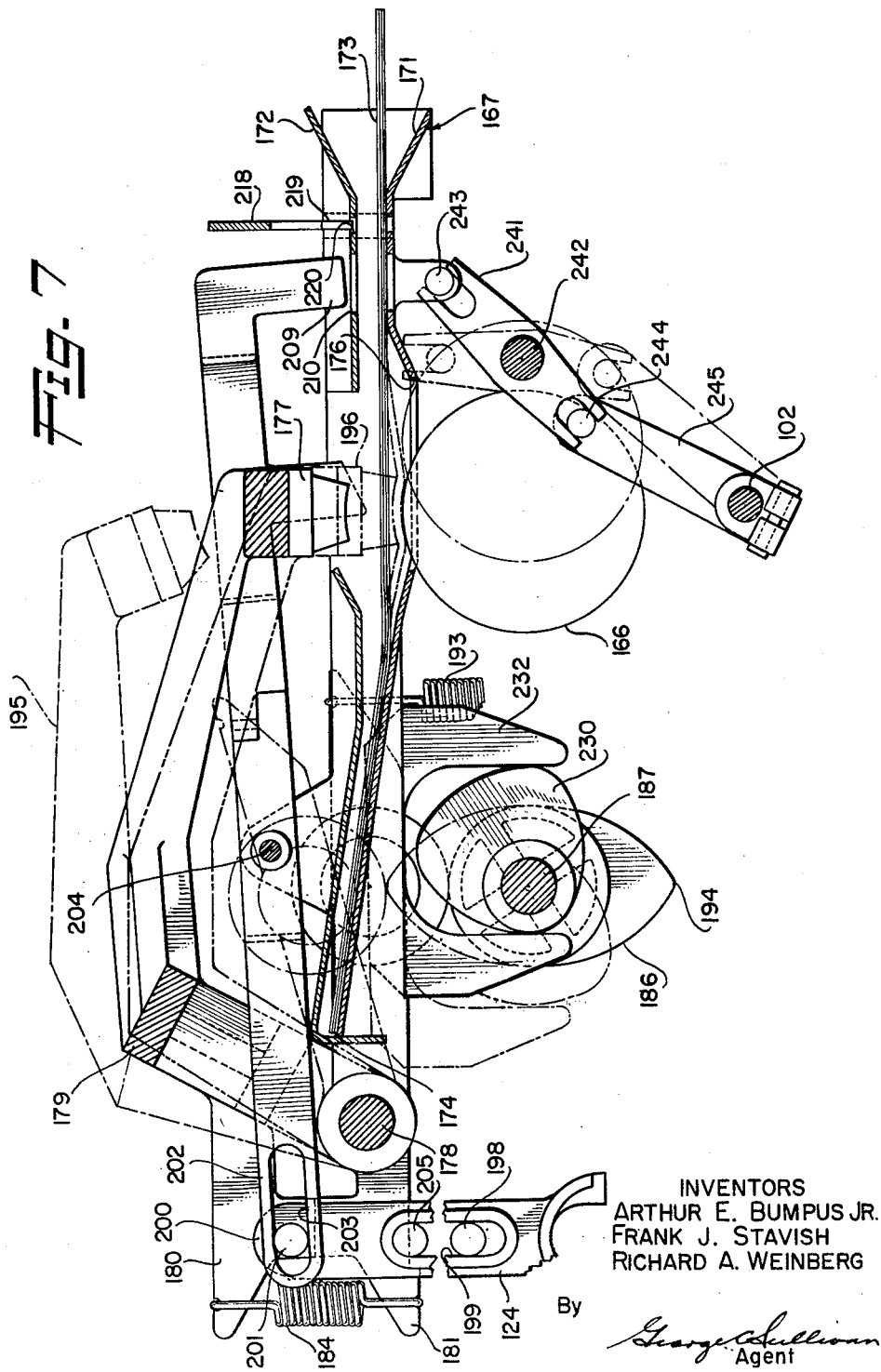

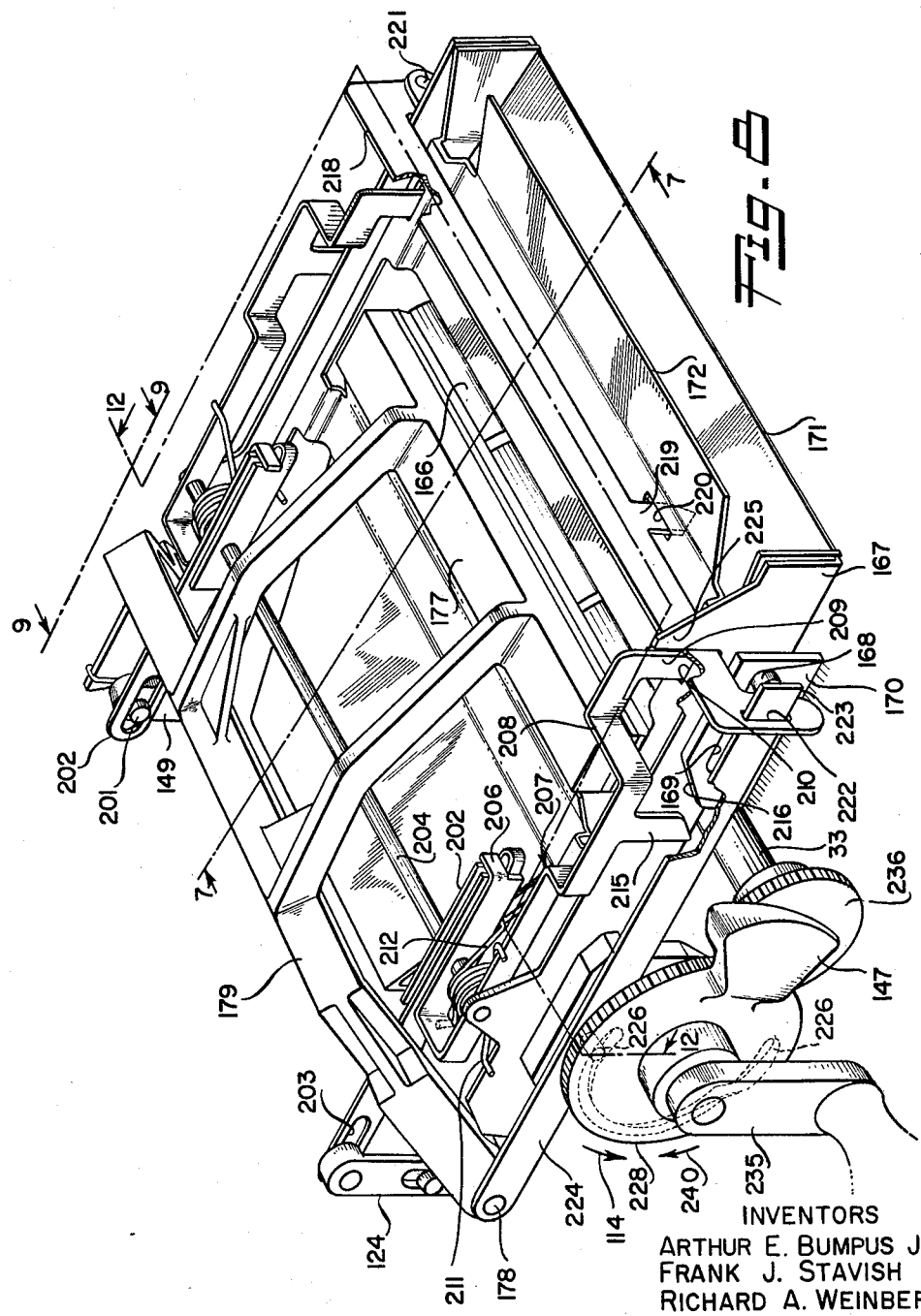
INVENTORS
ARTHUR E. BUMPUS JR.
FRANK J. STAVISH
RICHARD A. WEINBERG
By George C. Sullivan
Agent

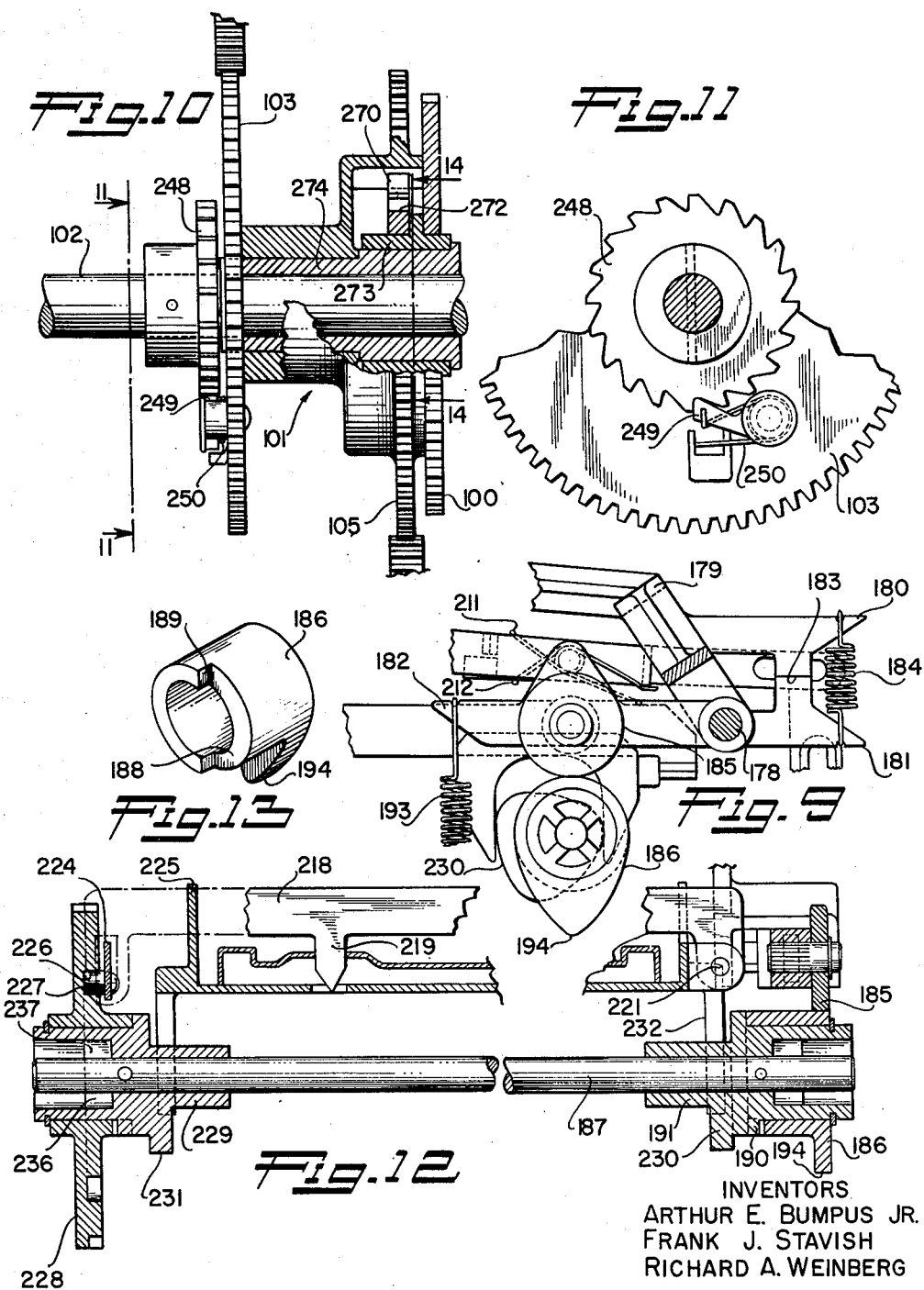

United States Patent Office 3,121,531
Patented Feb. 18, 1964

3,121,531
VARIABLE RATE COMPUTING AND RECORDING REGISTER
Arthur E. Bumpus, Jr., Matawan, Frank J. Stavish, South Plainfield, and Richard A. Weinberg, Pittstown, N.J., assignors, by mesne assignments, to Lockheed Aircraft Corporation, Burbank, Calif., a corporation of California
Filed Nov. 23, 1960, Ser. No. 71,215
13 Claims. (Cl. 235—58)

This invention relates generally to meter driven computers and more particularly to a computing register using such multiple inputs as unit price, tax rate, discount rate, metered quantity, etc. and printing the computed sales tax and total dollar amount involved including sales tax and/or discount where applicable as well as the unit price on a recording sheet or sales ticket.

Meter driven computers now in current use on fuel tank trucks, for example, are limited to those providing a visual readout and/or a printed record of quantity only. Tax and discount data as well as the actual billing price are calculated by an operator and handwritten on the sales ticket. This is both time consuming and subject to human error.

It is an object of this invention to provide a computing register which is capable of printing out on a recording sheet complete information such as unit price, total tax, total sale price including tax and/or discount where applicable for accounting and customer billing purposes.

It is another object of this invention to provide a computing register which is adapted to receive a recording sheet and by the simple rotation of a hand crank lock the recording sheet in position for printing, reset the computing register, perform initial and final printing operations and then release the recording sheet to permit its removal.

It is a further object of this invention to provide a computing register which will automatically and selectively compute a discount if applicable and/or the appropriate tax, depending upon the presence or absence of code characters in the recording sheet. Tax computations may be made at different rates and a no tax mode of operation may be provided where desired.

Another object of this invention is to provide a computing register which records and displays an exact accumulation of the information from each recording sheet.

Still another object of this invention is to provide a computing register which may be readily adjusted to provide price computations within a wide price range and which will automatically advance the printing mechanism to a full printing position so that the information on the recording sheet will always appear in clear legible characters.

Further and other objects will become apparent from a reading of the following detailed description especially when considered in combination with the accompanying drawings wherein:

FIGURE 2 shows schematically the computing register mechanism;

FIGURE 3 is a view showing the construction of the full cents price selecting mechanism and its physical relationship with respect to the tenths of a cent price selecting mechanism in the computing register;

FIGURE 4 is a view showing construction of the tenths of a cent price selecting mechanism;

FIGURE 5 is a fragmentary sectional side view showing construction details of the stepped cone gear and differential output in the computing register;

FIGURE 7 is a sectional side view taken on line 7—7 of FIGURE 8, showing the recording sheet carriage and printing mechanism;

FIGURE 8 is a perspective view of the recording sheet carriage and printing mechanism;

FIGURE 9 is a view taken on line 9—9 of FIGURE 8;

FIGURE 10 is a fragmentary sectional view showing the advancing drive for the print wheel counters;

FIGURE 11 is a fragmentary view taken on line 11—11 of FIGURE 10;

FIGURE 12 is a view taken approximately on line 12—12 of FIGURE 8;

FIGURE 13 is a perspective view showing the platen drive cam.

FIGURE 14 is a view taken approximately on line 14—14 of FIGURE 10.

The device of this invention, for purposes of clarity, shall be described herein for use in combination with a fluid meter; however, it is to be understood that the device may be used to provide a printed record of computed data with any type of meter for either fluids or solids.

Figure 1:
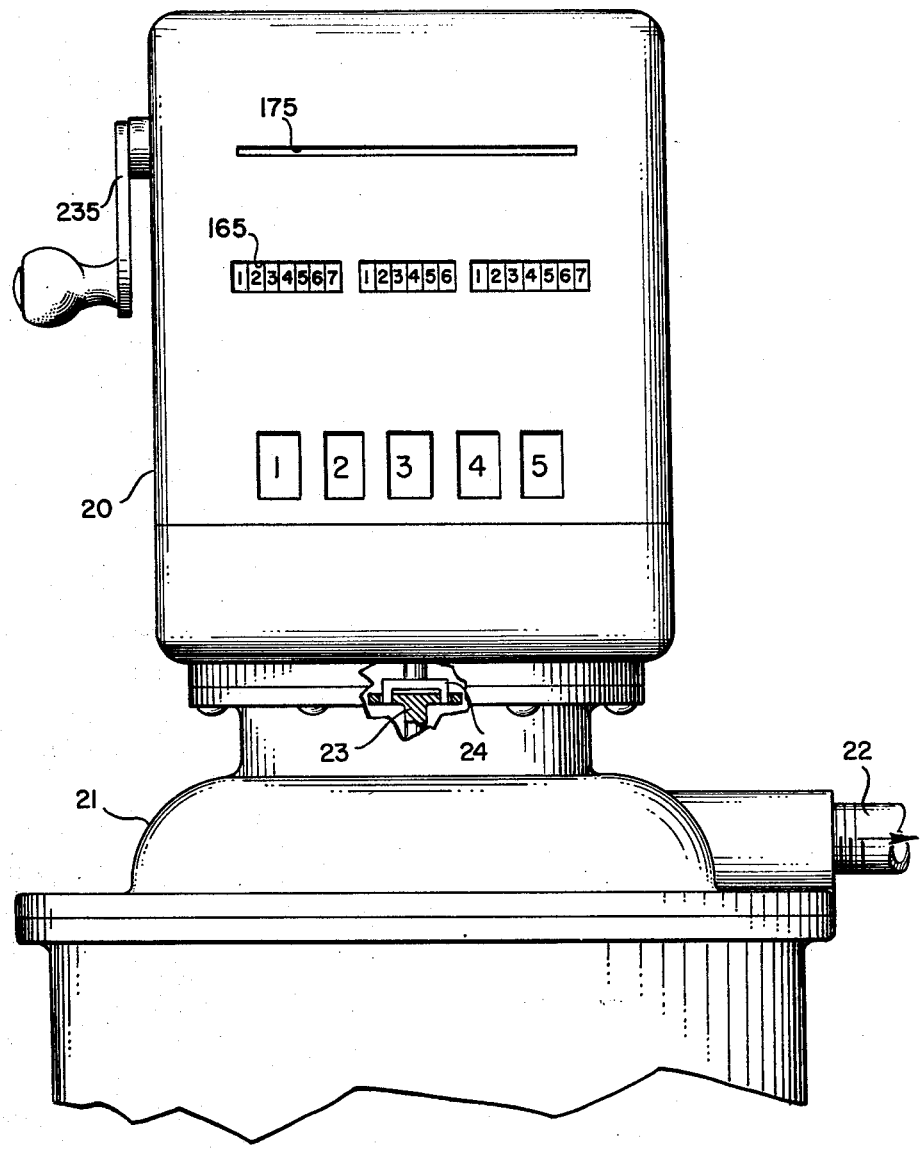
FIGURE 1 is a front view of the computing register shown mounted on a flow meter with a portion of the housing being broken away to reveal the drive coupling between the meter and computing register.

Referring to FIGURE 1, computing register 20 is shown suitably mounted on a meter 21 having a passage 22 through which fluid may be dispensed. Meter 21 does not form a part of this invention apart from the combination and may be any type of conventional metering device not necessarily limited to the metering of fluids. As is characteristic of a metering device, meter 21 has an output shaft 23 the rotation of which represents the volumetric flow of the fluid through the meter.

Shaft 23 of meter 21 provides the physical input to computing register 20 through coupling 24. As best shown in FIGURE 2, gear train 25 in computing register 20 is driven by meter shaft 23 through coupling 24. A stepped cone gear 26 is driven by gear train 25 to rotate at a rate proportional to the physical input from meter 21 so that each gear section 27 of the cone gear may be used to derive a sales price for any given quantity of fluid passing through the meter. Also, an output gear 28 in gear train 25 drives a print wheel counter 29 and two visual readout counters 30 and 31 respectively through gear train 32. Print wheel counter 29 and readout counter 30 are of a reset type such as is disclosed in United States Patent 2,285,825 and at pages 34 and 50 in the "Veeder-Root Counting Devices" catalog number G59 published in 1959 by Veeder-Root Inc., Hartford 2, Conn. Visual readout counter 31 is of the so-called non-resettable type and provides a visual record of the total number of gallons of fluid passed through the meter including previous deliveries where more than one delivery is involved. Non-resettable counters of the type useful in this instance are also disclosed in the above mentioned Veeder-Root catalog No. G59. Resettable counters 29 and 30 are zeroed by resetting the computing register through rotation of the respective shafts 33 and 34 in the same direction as the counters are driven in normal operation. These resettable counters indicate the total gallons delivered since the last resetting of the computing register.

Price computation in the computing register is accomplished by stepped cone gear 26 in combination with a pair of gear trains 35 and 36 driving a differential 37. Gear train 35 provides the whole cents price per gallon input to differential 37 while gear train 36 provides the tenths of a cent price per gallon input to the differential. By simply positioning the change gears 38 and 62 in gear trains 35 and 36 into engagement with the appropriate gear sections on the stepped cone gear 26, the desired price per gallon of the fluid is set into the computing register. The available range in price depends on the number of gear sections on the stepped cone gear and it is of course understood that any number of gear sections may be provided.

Change gear 38 in gear train 35 is swingably carried by an arm 40 depending from shaft 39 as shown in FIG-URES 2 and 3 so that by rotating arm 40 about shaft 39 change gear 38 may be moved out of engagement with stepped cone gear 26 and moved along shaft 39 to engage any of the several gear sections in the step cone gear to establish the correct whole cents price per gallon for the computing register. The positioning of change gear 38 on the stepped cone gear is effected manually by means of a lever 41 connecting with a push rod 42. Push rod 42, as shown in FIGURE 3, permits remote actuation of lever 41, the latter being physically located in an inaccessible area within the computing register.

Still referring to FIGURE 3, change gear 38 is locked in the desired whole cents price per gallon position with respect to the stepped cone gear by means of a pin 43 on push rod 42 which is arranged to engage one of notches 44 on a marked detent plate 45 as most clearly indicated in FIGURE 2. Pin 43 is held in the appropriate notch by means of a spring 46 acting between a flange 47' on supporting bracket 47 within the computing register and washer-retaining ring 48 on push rod 42. When pin 43 is disengaged, push rod 42 and supporting bracket 47 may be moved laterally on shaft 49 via two spaced guide members 87 which are integral with bracket 47. Push rod 42 may then be moved laterally to a new whole cents price per gallon gear section on stepped cone gear 26 and locked in a corresponding new notch in detent plate 45.

Remote reading of the whole cents price per gallon setting in the computing register is accomplished by means of a flange 50 projecting from lever 41 which engages a yoke 51 on a sliding rack gear 52. As arm 41 is moved laterally with push rod 42, rack 52 is also moved laterally to drive a pinion gear 53. Pinion gear 53 drives the whole cents side of a price per gallon print out wheel 54 through gear train 55 as shown in FIGURE 2. Rack 52 is allowed to move only laterally in a groove 56 formed in supporting structure 57 by a pin and slot connection 58.

Referring to FIGURE 2, lateral movement of arm 40 and lever 41 on shaft 39 is permitted while allowing gear 60 in gear train 35 to drive one side of differential 37 by providing a keyway 61 in shaft 39 and keying only gear 60 to the shaft. Thusly, while gear 60 and arm 40 may move axially on shaft 39 gear 60 will effect rotation of the shaft when driven by the stepped cone gear through change gear 38.

The tenth of a cent price per gallon setting of the computing register is likewise adjustable through lateral movement of change gear 62 in gear train 36 as shown in FIGURES 2 and 4. Change gear 62 is carried on one end of arm 63, the opposite end of which is swingably carried on shaft 64. Lateral movement of change gear 62 with respect to stepped cone gear 26 is effected manually through a lever 65, secured to arm 63 to pivot about the same shaft 64. A detent 66 on lever 65 is arranged to engage one of a series of notches 67 in a tenth of a cent detent plate 68. A curved rack gear 69 is formed on the hub portion 70 of lever 65 to engage a pinion 71 and effect rotation thereof as a result of lateral movement of lever 65. Remote reading of the tenth of a cent price setting is accomplished by driving the tenth of a cent side of print wheel counter 72 through shaft 73 and gear train 74.

While shaft 64 is provided with a keyway 59, gear 75 of gear train 36 is not keyed thereto, but is free to rotate and move axially relative to the shaft.

Stepped cone gear 26, as shown in FIGURE 5, is rotatably carried by supporting structure 76 in the computing register through shafts 77 and 78. The cone gear and gear 28 in gear train 25 are both fixedly secured to shaft 77 so that rotation of gear 28 drives the stepped cone gear. Bearing 80 carried by supporting structure 76 receives shaft 78 in one end thereof and 81 in the opposite end to provide support for both the cone gear and the differential. Additional support for the differential is provided by supporting structure 79 which receives the outer end of shaft 81 through bearing 82. As most clearly shown in FIGURE 5, shaft 81 is permitted to both rotate and move axially with respect to cone gear 26 and to move axially with respect to the differential as limited by pin 88 in elongated slot 83.

Input gears 84 and 85 to the differential are free to rotate on the shaft with the output of the differential being obtained at shaft 81 through planetary action of beveled gear 86 on pin 88. Since both the whole cents and tenth of a cent price components are combined in the differential, rotation of output shaft 81 is proportional to the quantity of fluid passed through meter 21 and represents the total price of such quantity of fluid.

Shaft 81, which serves as the output of differential 37, drives either gear 90 or gear 91 through clutches 92 or 93 respectively depending upon which of the two clutches is engaged. As shown in FIGURE 2, gear 90 engages gear 94 which is carried on shaft 95. Gear 91 engages gear 96 on the same shaft 95. Gears 94, 96 and 99 are fixed together and are free to rotate on shaft 95. Gear 99 engages gear 100 which drives gear assembly 101, floatingly carried on shaft 102. Gear 103 in gear assembly 101 drives a print wheel counter 104 (similar in construction to print wheel counter 29) to indicate the total price of the quantity of fluid delivered through the meter since last resetting the computing register. As is implied print wheel counter 104 is of the resettable type. Resetting of the print wheel counter to zero is accomplished by rotation of shaft 33 (on which the print wheel counter is mounted) in the same direction as that which the print wheel counter is normally driven in performing the price counting function.

Gear 105 in gear assembly 101 drives a visual readout counter 106. The visual readout counter is part of the totalizer section and accumulates the total sales including tax.

Computation of the tax is accomplished in the computing register by gear train 108 driven from gear 109 or gear train 261 driven from gear 260, as best shown in FIGURE 2. One side of tax clutch 97 is fixed to tax gear 109 which is carried by and is free to rotate on collar 110. Price gear 90 and one side of clutch 92 are fixed to collar 110 and are free to rotate on shaft 81 as best shown in FIGURE 5. Similarly, one side of second tax clutch 98 is fixed to tax gear 260 which is carried by and is free to rotate on collar 262 while price gear 91 and one side of clutch 93 are fixed to collar 262, free to rotate on shaft 81. When clutches 92 and 97 are engaged as shown in FIGURES 2 and 5, the gearing associated with these clutches drives price counters 104 and 106 through gear 94 and tax counters 111 and 112 through gear 109 to compute price and tax at one tax rate. When clutches 92 and 97 are disengaged and clutches 93 and 98 are engaged, the gearing associated with these clutches drives the price counters through gear 96 and the tax counters through gear 260 to compute price and tax at a different tax rate by virtue of the different gear ratio in the tax counter gear train driven through clutch 98. Where price gear 91 is the same size as price gear 90, the total price will remain the same and only the tax total will differ when shifting to operate through clutches 93 and 98 rather than clutches 92 and 97. By deleting second tax clutch 98, a no tax mode of operation is obtained.

Axial movement of shaft 81 to selectively engage clutches 92 and 97 or 93 and 98 is automatically effected through lateral movement of an arm 115, one end 116 of which is formed as a collar to ride in a grooved hub 117 on shaft 81 as best shown in FIGURE 5. Lateral movement of arm 115 effects axial movement of shaft 81 to which one side of clutches 92, 93, 97 and 98 are secured.

Figure 6:
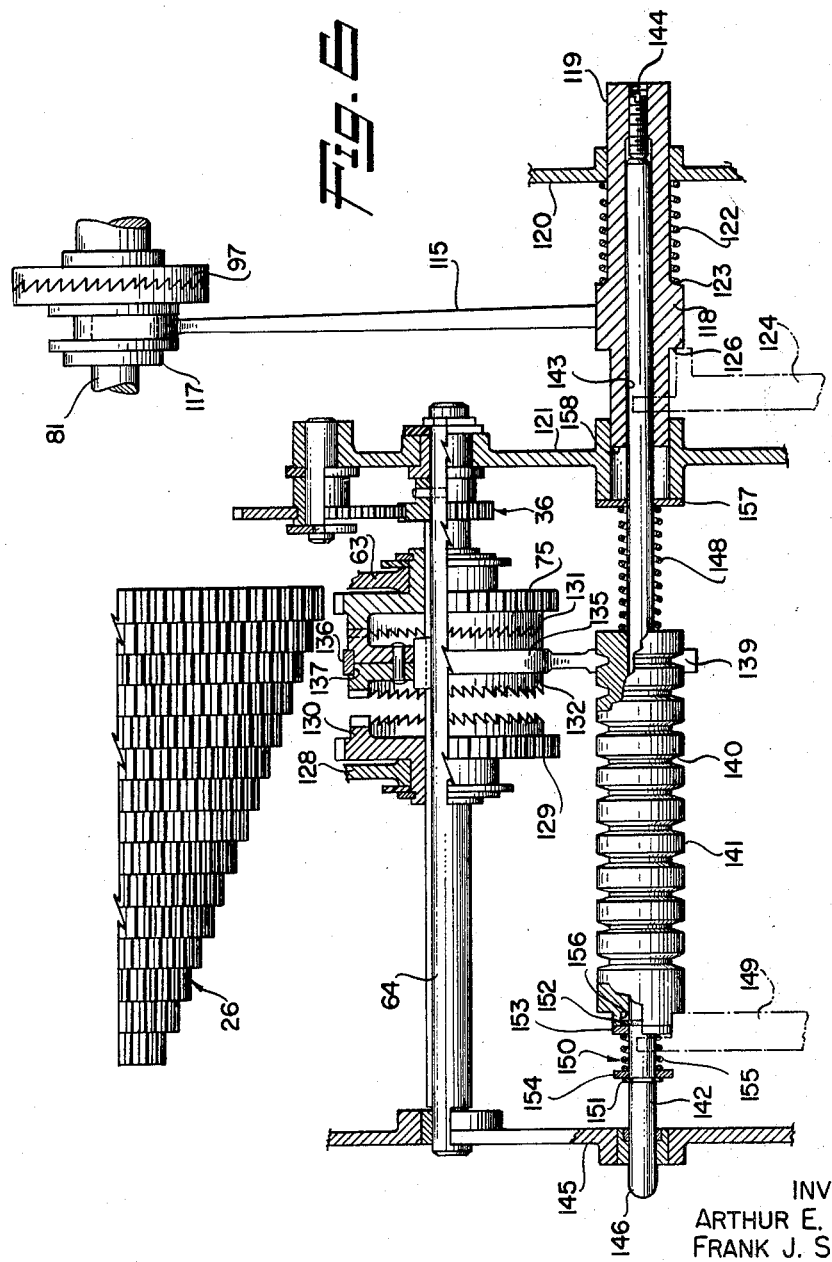
FIGURE 6 is a fragmentary sectional side view showing construction details of the tax and discount clutching mechanism.

Now referring to FIGURE 6, the opposite end 118 of arm 115 is carried by hollow axle 119 slidably received on supporting structure 120 and 121. A spring 122 concentrically arranged with respect to axle 119 between supporting structure 120 and a retaining collar 123 on the axle normally urges arm 115 to move laterally to an extreme left position as viewed in FIGURE 6 causing tax clutch 98 to be engaged and tax clutch 97 to be disengaged. Arm 115 is held in the lateral position against the action of spring 122, causing engagement of tax clutch 97, by a retractable latch lever 124 which is tripped by the presence of a tax code slot in the recording sheet as hereinafter more fully described in connection with FIGURES 7 and 8. Latch lever 124 in the latched or locked position butts against the flange 126 on axle 119 as indicated in FIGURES 2 and 6 and in the unlatched or tripped position is retracted to permit movement of arm 115 to the left as urged by spring 122.

Means for automatically applying a discount to the established price per gallon of the fluid being dispensed is shown in FIGURES 2 and 6 collectively. A discount gear 127 carried on arm 128 is arranged to engage a lower order gear section of the stepped cone gear 26 and drive gear train 36 through gear 129 and clutch 130 in lieu of driving gear train 36 by means of change gear 62 through its associated clutch 131. Gear 129 and gear 75 both float on shaft 64 and are free to rotate except when its associated clutch is engaged. The double faced movable member 132 of clutches 130 and 131 is keyed to shaft 64 to rotate only with the shaft while being permitted free axial movement relative thereto. Movement of clutch member 132 to drive gear train 36 through clutches 131 or 130 is controlled by an arm 135 having a collar 136 on one end thereof loosely riding in a groove 137 on the outer periphery of clutch member 132. The opposite end of arm 135 is formed to provide an arcuately curved tooth detent 139 for releasably engaging one of a series of grooves 140 formed on the outer surface of a sleeve 141. With detent 139 in engagement with a notch on sleeve 141, it is apparent that by moving the sleeve axially, clutch 130 or clutch 131 may be selectively used in driving gear train 36. Sleeve 141 slidably receives a reset shaft 142 which passes entirely through the sleeve and into bore 143 of axle 119 to butt against stop 144 at the opposite end of the axle which may be made adjustable as indicated in the drawing. The free end of reset shaft 142 extends slightly beyond supporting structure 145 and is provided with a rounded head 146 for engaging a reset cam 147 as schematically indicated in FIGURE 2.

A compression spring 148, acting between a washer 157 at supporting structure 121 and one end of sleeve 141, forces the sleeve in a direction to engage clutch 130 and the discount drive gearing. In order to drive through change gear 62 and compute price information without a discount, sleeve 141 is normally held from moving due to the force exerted by spring 148 by means of a retractable latch lever 149 which is released in a manner similar to that briefly described in connection with latch lever 124.

As is apparent from FIGURE 6, if either latch lever 124 or 149 is retracted, the associated clutch cannot be returned to the normal position shown in FIGURE 2 unless a force is applied to overcome compression springs 122 and 148. It is the function of reset shaft 142 to provide the means for transmitting such a force through sleeve 141 and axle 119. Obviously by pushing reset shaft 142 to the right as viewed in FIGURE 6 it will engage stop 144 in axle 119 and force the same to return to its normal position in locked engagement with latch lever 124. In order to force sleeve 141 to return to its normal position in locked engagement with latch lever 149 by pushing on reset shaft 142, an overload spring assembly 150 is retained on the reset shaft.

Overload spring assembly 150 consists of a pair of retaining rings 151 and 152 which seat in spaced grooves formed circumferentially around the reset shaft between sleeve 141 and supporting structure 145. Between retaining rings 151 and 152 on shaft 142 are a pair of floating washers 153 and 154 spaced apart and urged against the retaining rings by overload spring 155 carried concentrically on the reset shaft. A groove 156 is cut in sleeve 141 to provide clearance for retaining ring 152 so that only the floating washer 153 will butt against the end face of the sleeve and force the latter to return to its normal locked position by pushing on the reset shaft. Overload spring 155 has a substantially higher spring force than compression spring 148 so as not to deflect appreciably when performing the reset operation.

In performing the reset operation, shaft 142 is driven to the right far enough to guarantee the resetting of latch levers 124 and/or 149. This action causes jamming of clutch members 131 and 132 which is relieved by compression of the overload spring.

Arm 115 is a semi-rigid member flexible enough to perform the same function as overload spring assembly 150. Supporting arm 128 for discount gear 127 is swingably carried on shaft 64 and fixedly secured to arm 63 supporting change gear 62 as is indicated in FIGURE 2. Accordingly lever 65 moves both discount gear 127 and change gear 62 in unison when changing the price per gallon setting of the computer register as described in connection with FIGURE 4. Specifically referring now to FIGURE 4, it is seen that a tension spring 160 acts between arm 135 and lever 65, holding the arm by force of the spring into engagement with the groove in sleeve 141. In order to slide the assembly along shaft 64, it is apparent that arm 135 must be released from sleeve 141 and this is accomplished by an extension 161 on lever 65 which is arranged to engage arm 135 and force the same away from sleeve 141 when lever 65 is moved to the extreme clockwise position as viewed in FIGURE 3. The plurality of grooves in sleeve 141 as shown in FIGURE 6 are provided for the purpose of mating with tooth detent 139 on lever 135 for all positions of the change and discount gears 62 and 127.

Lever 65 is normally held locked in a notch 67 on detent plate 68 preventing lateral movement of the assembly or rotation of arm 135 out of locked engagement with sleeve 141 by means of a second tension spring 162 acting between the lever and fixed member 163 forming a part of the supporting structure. Manual movement of lever 65 from the locked position requires overcoming the force of spring 162.

As previously indicated herein, the computing register provides both visual and printed computer output data through the several visual and print wheel counters. Visual readout is accomplished by physically locating the visual counters so that they may be viewed through windows 165 in the computer register housing as indicated in FIGURE 1. The print wheel counters on the other hand are physically located as indicated in FIGURES 7 and 8 at 166 immediately beneath and adjacent a movable carriage 167.

Movable carriage 167 is suitably supported within the housing of the computing register for fore and aft movement in one plane by slides 168 on carriage 167 engaging slots 169 in supporting structure 170 (FIGURE 8). Carriage 167 includes a pair of spaced plates 171 and 172 for receiving a somewhat flexible recording sheet 173 there between as shown in FIGURE 7 and support the same above the print wheel counters in the proper position for receiving printed information. The aft end 174 of spaced plates 171 and 172 are joined as indicated in the drawing to provide a positive stop for the recording sheet inserted therein. The spaced plates at the open end are flared outwardly to index with slot 175 in the computing register housing shown in FIGURE 1 and to facilitate insertion of the recording sheet 173 into the computing register for recording the computed data. As most clearly shown in FIGURE 7, lower carriage plate 167 is provided with an opening 176 so that the flexible recording sheet will normally assume a position immediately above the print wheel counters but may be forced down onto the print wheels.

A platen 177 is swingably carried adjacent carriage 167 by pins 178 on fixed supporting structure (not shown) indicated in FIGURES 7 and 8 for urging recording sheet 173 into engagement with the print wheel counters. Platen arm 179 is provided with an extension member 180 which is adapted to butt against an extension member 181 on a platen actuating lever 182 as indicated at 183 in FIGURE 9. Platen actuating lever 182 is swingably carried on the same pins 178 which carry platen 177. A tension spring 184 acting between extension members 180 and 181 urges the two members into the abutting relationship so that swinging movement of actuating lever 182 about shaft 178 will cause corresponding movement of platen 177 about pins 178. Lever 182 carries a roller 185 arranged to engage platen actuating cam 186. Cam 186 is carried on shaft 187 through hub 191 as shown in FIGURES 9 and 12. Referring now to FIGURE 13, platen actuating cam 186 is recessed at 188 to form a detent 189 for engaging a tooth 190 on hub 191. Hub 191 is pinned to shaft 187 while cam 186 is allowed to rotate relative thereto within the limits defined by tooth 190 and detent 189. A tension spring 193 at the outer end of platen actuating lever 182 urges roller 185 into engagement with cam 186 to support platen 177 in a suspended or neutral position out of contact with the recording sheet 173 as indicated by solid lines in FIG. 7. Rotation of shaft 187 causes tooth 190 to engage detent 189 on cam 186 and rotate the latter until the high point 194 on the cam has raised the platen through roller 185 to the dotted line position identified as 195 in FIGURE 7. As cam 186 passes top-dead-center, the spring force on the platen urges it downward toward the recording sheet causing cam 186 to lead shaft 187. The platen picks up momentum as cam 186 falls freely to its minimal position and this momentum of platen 177 causes it to pass its neutral position, stretching spring 184 and forcing recording sheet 173 against the print wheel counters to record the indicia on the counters. The printing position of platen 177 is indicated by dotted lines at 196. The energy of tension spring 184 then returns platen 177 to its neutral position allowing recording sheet 173 to again assume a position spaced from the print wheel counters. Movement of platen 177 from its neutral position to the printing position is accompanied by relative movement between platen arm 179 and actuating lever 182 causing extension members 180 and 181 to move away from each other and it is this action which elongates tension spring 184 and allows it to return the platen from the printing position to the neutral position.

Again referring primarily to FIGURES 7 and 8, latch levers 124 and 149 for controlling the tax and discount portions of the computer as mentioned in connection with the description of FIGURE 2 are physically arranged one on either side of movable carriage 167. Latch levers 124 and 149 are each carried by two pins 198 and 205 on the fixed structure of the computing register. These pins 198 and 205 engage the latch lever through a slot 199 allowing only limited movement of the lever. The upper end 200 of each latch lever carries a pin 201 engaging lever 202 through slot 203. Lever 202 is fulcrumed at its forward end about pin 204 on movable carriage 167. This linkage arrangement allows lever 202 to move fore and aft with carriage 167 without triggering either of the latch levers; however, rotation of lever 202 about its fulcrum 204 will be effective to raise the associated latch lever and retract the same from engagement with its associated discount sleeve 141 or tax axle 119.

As shown in FIGURE 8 each lever 202 projects forwardly beyond pin 204 to engage a detent 206 on a generally U-shaped lever 207 fulcrumed in the U by the same pin 204 which serves as a fulcrum for lever 202. One arm 208 of lever 207 extends forwardly and carries a finger 209 which indexes with an opening 210 formed in plates 172 and 171 of carriage 167. As is apparent from FIGURE 8 when lever 207 is moved about its fulcrum 204 in a direction such that its associated finger 209 is inserted through openings 210 in the carriage, lever 202 is caused to move correspondingly with result that latch lever 124 is triggered by being raised. Each actuating assembly for latch levers 124 and 149 is provided with a pair of coil springs 211 and 212 carried concentrically around shaft 204 in the U of lever 207. Spring 211 acting between the carriage and lever 207, urges lever 207 in the direction to insert its finger into opening 210 while spring 212, acting between levers 207 and 202, urges lever 202 in the opposite direction urging detent 206 on lever 207 to engage the forward end of lever 202.

Fingers 209 on levers 207 are held in a raised position to permit insertion of the recording sheet when carriage 167 is in the forward position by means of a cam follower 215 on levers 207 and a cam 216 on carriage supporting structure 170. Recording sheet 173 is therefore inserted in carriage 167 to bottom against the aft end 174 of spaced plates 171 and 172 when the carriage is in its most forward position. Fingers 209 are allowed to contact the recording sheet as the carriage is moved aft and cam follower 215 loses contact with cam 216. If the recording sheet 173 is provided with a code perforation which will index with either of fingers 209, the finger will fall through the perforation as urged by the force of spring 211 and retract latch lever 124 or 149. This introduces the discount and tax computations and is dependent on whether or not there are code perforations in the recording sheet.

Since the tax and discount functions of the computing register are automatically controlled by code perforations in recording sheet 173 which must index with fingers 209 of the latch lever actuating mechanisms, it is of importance to provide means for properly positioning the recording sheet in the carriage and for holding the sheet in the proper position while recordings are being made. In this connection, a staking bar 218 is provided on carriage 167 which extends transversely of the carriage above upper plate 172. The bar is raised and lowered with respect to carriage 167 so that a staking pin 219 carried on the bar may project through openings 220 in plates 171 and 172, perforating the recording sheet and firmly holding the same locked in position. One end of bar 218 is hinged to carriage 167 through pin 221. The opposite end of the bar is provided with a slot 222 which receives one end 223 of the control rod 224. The free end of rod 224 is pivotally connected to the same pin 178 which carries platen 177. By swinging rod 224 about pin 178, bar 218 and its staking pin 219 may be raised and lowered. To further guide bar 218, it is received in a slotted bracket 225 on carriage 167 adjacent the end which engages control rod 224.

Control lever 224 carries a cam follower 226 which rides in a cam groove 227 on gear 228 as shown in FIGURES 8 and 12. Gear 228 is secured to shaft 187 through hub 229. As is apparent from the shape of cam groove 227, as shown in FIGURE 8, staking pin 219 is retracted from opening 220 in carriage 167 during only a few degrees of rotation of the gear. At all other rotational positions of gear 228, the staking pin projects through openings in the carriage plates to lock a recording sheet in position.

It should be apparent at this point that proper sequencing of carriage and platen movement as well as movement of the staking pin and latch lever actuating mechanisms is essential. This sequencing is accomplished by the cams and gearing associated with shaft 187. The carriage movement is coordinated with the other operations by cams 230 and 231 formed integral with hubs 191 and 229 respectively. The carriage cams are both identical and shown in FIGURES 7, 9 and 12. A yoke 232, one for each cam 230 and 231, projects from carriage 167 to engage the cam and position the carriage in accordance with the position of the cams. With gear 228 rotated to the opposite extreme position shown in FIGURE 8 so that staking pin 219 is in a retracted position permitting insertion of recording sheet 173, the carriage is positioned in its most forward location shown in FIGURE 7. In this position of the carriage, platen drive cam 194 is in its minimal position allowing the platen 177 to assume its neutral position. At this initial stage in the sequence of operations, the recording sheet 173 is inserted in the carriage. Then hand crank 235, shown in FIGURE 8, is received within the annular opening between shaft 187 and hub 229 or 191 (FIGURE 12) through openings in the side of the computing register housing to engage a pair of teeth 236 and 237 in the annular opening. As crank 235 is turned from the starting position in the direction indicated by arrow 114 in FIGURE 8, cam follower 226 rides down in its recessed cam 227 in gear 228, causing staking pin 219 to pierce recording sheet 173 and lock the same in position. Then carriage 167 begins moving aft due to rotation of cams 230 and 231. As the carriage moves aft, platen drive cam 194 moves ot its top-dead-center position raising platen 177. Slight additional rotation of shaft 187 rotating platen drive cam 194 slightly beyond the top-dead-center position results in the platen drive cam freely swinging to its minimal position allowing platen 177 to drive downwardly forcing recording sheet 173 against the print wheel counters to take an initial recording of the counter settings. Tension spring 184 in the platen actuating linkage immediately returns platen 177 to its neutral position allowing the somewhat flexible recording sheet to spring back, away from the print wheel counters.

After cam follower 215 moves away from cam 216 as a result of aft movement of carriage 167 and before the carriage reaches its most aft position, cam 147 on gear 228 engages the rounded projecting end 146 of reset shaft 142 and pushes the same to the right as viewed in FIGURE 6. This allows latch levers 124 and 149 to engage axle 119 and sleeve 141 respectively. If there are code perforations in recording sheet 173 which index with fingers 209 in the latch lever actuating mechanisms, the fingers drop independently through the openings in the recording sheet and trip their respective latch levers. This shifts the associated clutches to apply a discount to the computations and/or to select one tax rate. On the other hand, if there are no core perforations in recording sheet 173, latch levers 124 and 149 are not tripped. Consequently the computations are made without a discount and with a different tax rate.

Also during rotation of gear 228 by crank 235 in the direction of arrow 114 moving carriage 167 aft, gear 236 in engagement with gear 228 is rotated to drive shaft 33 in a direction to zero the print wheel counters. This zeroing of the print wheel counters is accomplished during the initial rotation of gear 228 from its starting position so that the print wheel counters are zeroed before recording sheet 173 is struck by platen 177 and pressed against the counters for the initial recording.

Visual readout counter 30 is reset to zero through gears 237, 238 and 239, shown in FIGURE 2, at the time the printout counters are reset.

After the computing register has been prepared for operation by rotating gear 228 to the extreme position shown in FIGURE 8, the operator is ready to make a delivery of fluid through meter 21. As the fluid flows through the meter, output shaft 23 thereof drives the computing mechanism in the computing register at a rate proportional to the quantity of fluid passing through the meter. This input shaft rotation is operated on by the computing register to provide a visual indication of the gallons delivered. When the desired quantity of fluid has been delivered the operator stops the flow of fluid through meter 21. Print wheel counters 29, 111 and 104, being driven simultaneously with the visual readout counters, provide corresponding output data as to price, tax and gallonage. The price per gallon print wheels 54 and 72 being pre-set into the computing register, remain fixed during the metering operation. With the fluid delivered, the operator rotates drive gear 228 through hand crank 235 in the direction indicated in FIGURE 8 by the arrow 240. Rotation of gear 228 in such direction is not effective to reset the counters and accordingly they remain in the position to which they were driven when fluid flow through meter 21 was stopped.

The readings on the lowest order wheel in each resettable print wheel counter in the computing register may, on completion of a delivery, be at a printout position between two numbers on the print wheel and thus not be at a full print position. To insure obtaining a readable record on the recording sheet, the print wheels must all be at a full print position at the time the record is made. Accordingly means are provided for advancing the print wheel counters to a full read position before the final recording is made following each delivery. This is accomplished by a linkage working off carriage 167 as shown in FIGURES 2 and 7 which rocks shaft 102. Specifically, a rocker arm 241, fulcrumed about pin 242 fixed with respect to the computing register supporting structure is bifurcated at each end to engage pin 243 on carriage 167 and pin 244 on lever 245. Lever 245 is secured to shaft 102 whereby initial forward movement of carriage 167 causes shaft 102 to be rotated in the counter advancing direction. Advancement of the counters due to the rocking of shaft 102 occurs only in the event they are not in the full read or the full print position due to the action of a ratchet drive mechanism employed as shown in FIGURES 2, 10 and 11. Counter drive gears 103, 246 and 247 are free to rotate on shaft 102 as previously described. These gears are connected to the shaft only through the pawl and ratchet assembly shown in FIGURES 2, 10 and 11. Referring to these three figures, ratchet wheel 248 is pinned to shaft 102 adjacent each counter drive wheel 103, 246 and 247. A pawl 249, swingably carried on each counter drive gear such as gear 103, is arranged to engage the teeth on ratchet wheel 248. Pawl 249 is urged in the direction of the ratchet wheel by spring 250. Rotation of shaft 102 in the direction opposite to the direction gears 103, 246 and 247 are driven to perform the counting function causes pawl 249 to simply ride over the top of teeth on ratchet wheel 248 and hence the counter drive wheels are not affected by such rotation of shaft 102. However, by rotating shaft 102 in the same direction as the counter drive gears are rotated to perform the counting function, the counters will be advanced to the full print and read position by pawl 249 engaging a tooth on ratchet wheel 248. By controlling the amount of rotation of shaft 102 in response to carriage motion and by selecting the proper number of teeth on sprocket wheel 248, the counters are advanced only when they are not already in the full print and read position. When the counters are at the full print and read position, pawl 249 is in full engagement with one of the teeth on ratchet wheel 248.

Referring to FIGURES 10 and 14 during advance of the print wheel counters 29, 104 and 111 to the full print position, the associated gear assembly such as gear assembly 101 is rotated while its drive gear 100 remains stationary. This is accomplished by means of detent spring 270 retained by flanges 271 on gear 105 in gear assembly 101 and acting against ratchet 272 which is fixed to gear 100. Gear-ratchet assembly 273 is rotatably carried on hub 274 which is fixed to gear assembly 101. During advance, gear assembly 101 rotates, forcing detent springs 270 to deflect, overriding ratchet 272 on gear ratchet assembly 273 which remains stationary. This mechanism isolates the advancing action from the drive gear train. In normal operation gear-ratchet assembly 273 is rotated causing ratchet 272 to engage spring detent 270 which drives gear assembly 101 through flange 271.

A second function of detent spring 270 is to resist rotation of gear assembly 101 by counter 104 during reset of the counter. This function is accomplished by the frictional resistance offered to ratcheting action of the detent spring 270 against ratchet 272 and is necessary to prevent rotation of the totalizer readout counter 106 during reset.

The next action which occurs from rotation of gear 228 in the direction of arrow 240 to move carriage 167 forward is to raise platen 177 through platen drive cam 186 and cause it to press recording sheet 173 against the print wheel counters, printing on the recording sheet the print wheel counter output information including price with the discount, if any, tax, if applicable, and gallonage delivered. Continued rotation of gear 228 in the direction indicated by arrow 240 causes cam follower 215 to ride up on cam 216 raising the tax and discount fingers 209 and staking pin 219 to release recording sheet 173. When the rotational limit of gear 228 is reached, carriage 167 is at its most forward position and the recording sheet 173 is removed from the computing register with the initial and final readings appearing thereon.

To prepare the computing register for another delivery, a new recording sheet is inserted in the carriage and crank 235 is again rotated in the direction of arrow 114 to lock the sheet in the carriage, reset the counters, make an initial recording and perform the other pre-delivery operations described above.

In the device disclosed herein, means are provided for automatically changing two computer functions, i.e. the tax and discount computations. Obviously the device may be modified to automatically change any number of different functions using the same general technique and mechanism disclosed for such purposes. Also tax computations may be made selectively at different rates such as by simply duplicating the cone gear in the tax computing section of the register. Still further means such as disclosed in U.S. Patent 2,099,129 for automatically stopping the flow of fluid after a predetermined quantity has been delivered may obviously be employed in combination with the disclosed computing register.

The term "perforations" as used herein in connection with the recording sheet is intended to include slots, indentations, notches, holes or any other code character for performing the same function.

While a single embodiment of the computing register has been described herein it should be understood that many alterations, modifications and substitutions such as those suggested above may be made without departing from the teachings of the invention as defined by the spirit and scope of the appended claims.

We claim:

1. A computing register for use in combination with a quantity metering device for computing and printing data on a flexible recording sheet comprising, a frame, shaft means carried by said frame and adapted to be rotatably driven by the quantity metering device, gear means driven by said shaft, print wheel counting means operatively coupled with said gear means and providing a registration which is proportional to the metered quantity, a carriage mounted on said frame adjacent said print wheel counting means and adapted to receive the flexible recording sheet and support the same in spaced relation to the print wheel counting means, said carriage having an opening formed therein exposing said print wheel counting means to the recording sheet, a spring loaded platen swingably mounted adjacent said carriage for movement between an intermediate neutral position spaced from the recording sheet and two extreme positions, one a printing position pressing the flexible recording sheet into contact with the print wheel counting means and the other an elevated energy storing position, means advancing the print wheel counting means to a full print position, lever means associated with said gear means for manually changing the gear ratio, shift means for sensing a control perforation in the recording sheet for automatically changing the gear means gear ratio, and cam shaft means carried by said frame and being rotatable in one direction to sequentially actuate the advancing means moving said print wheel counting means to a full print position and moving said platen to drive said recording sheet into printing engagement with said print wheel counting means, and rotatable in the opposite direction to return said shift means and said print wheel counting means to their original starting positions.

2. A computing register for use in combination with a quantity metering device comprising, a frame, a stepped cone gear having a plurality of gear sections of different diameter rotatably carried by said frame, means operatively coupling said cone gear to said metering device for rotation by the metering device, a differential, a pair of gear trains coupling the differential with said stepped cone gear to provide an output at the differential proportional to the metered quantity, one of said gear trains including a pair of gears operatively engaging said stepped cone gear, first clutch means selectively connecting one or the other of said pair of gears in said one gear train with said differential to change the proportionality of the differential output with respect to the metered quantity, means associated with each gear train for selectively moving the same into operating engagement with any gear section on said stepped cone gear to change the proportionality of the differential output with respect to the metered quantity, a third gear train, second clutch means selectively coupling said third gear train with said differential output to provide a gear output proportional to the differential output, first counter means driven by said gear output and indicating the total gear output, second counter means driven by said differential output and indicating the total differential output, and means selectively actuating both said first and second clutch means independently.

3. A computing register for use in combination with a quantity metering device for printing computed data on a recording sheet comprising, a frame, a stepped cone gear rotatably carried by said frame and having a plurality of gear sections of different diameter, shaft means adapted to be driven by the metering device and rotating said cone gear proportional to the metered quantity, a differential, a pair of gear trains coupling the differential with said cone gear to provide a combined output at the differential which is proportional to the metered quantity, one of said gear trains including a pair of gears operatively engaging said cone gear, clutch means selectively connecting one or the other of said pair of gears in said one gear train with said differential to change the proportionality of the differential output with respect to the metered quantity, means associated with each gear train for selectively moving the same into operative engagement with any of the gear sections on said cone gear to change the proportionality of the differential output with respect to the metered quantity, a print wheel counter driven by said differential and providing a registration proportional to the total metered quantity, a carriage mounted on said frame adapted to receive the recording sheet, a platen swingably carried by said frame and being responsive to actuation for pressing said recording sheet against said counter to make a record of the print wheel counter registration, a shaft rotatably carried by said frame, and cam means carried on said shaft and actuating said platen in response to rotation of said shaft.

4. A computing register for use in combination with a quantity metering device for printing computed data on a recording sheet comprising, a frame, a stepped cone gear rotatably carried by said frame and having a plurality of gear sections of different diameter, shaft means adapted to be driven by the metering device and rotating said cone gear proportional to the metered quantity, a differential, a pair of gear trains coupling the differential with said cone gear to provide a combined output at the differential which is proportional to the metered quantity, one of said gear trains including a pair of gears operatively engaging said cone gear, clutch means selectively connecting one or the other of said pair of gears in said one gear train with said differential to change the proportionality of the differential output with respect to the metered quantity, means associated with each gear train for selectively moving the same into operative engagement with any of the gear sections on said cone gear to change the proportionality of the differential output, a print wheel counter driven by said differential and providing a registration proportional to the total metered quantity, a carriage mounted on said frame for limited fore and aft movement and adapted to receive the recording sheet and move the same into position adjacent said print wheel counter for a recording, shift means for sensing a control perforation in said record sheet for automatically actuating said clutch means upon movement of said carriage, a platen swingably carried by said frame and being responsive to actuation for pressing said recording sheet against said counter to make a record of the registration, a shaft rotatably carried by said frame, and cam means on said shaft actuating said platen and controlling fore and aft movement of said carriage in response to rotation of said shaft.

5. A computing register for use in combination with a quantity metering device for computing and printing data on a flexible recording sheet comprising, a frame, gear means adapted to be driven by the metering device, a print wheel counter driven by said gear means to provide a registration which is proportional to the metered quantity, a carriage mounted on said frame and adapted to receive the recording sheet and position the same adjacent said print wheel counter for a recording, platen means responsive to actuation for pressing said recording sheet against said counter to make a record of the registration, lever means releasably securing said recording sheet in said carriage, shaft means responsive to rotation for moving said lever means and actuating said platen to make recordings on said recording sheet with the latter secured in said carriage, and shift means for sensing a control perforation in said recording sheet to selectively change the gear means gear ratio.

6. A computing register for use in combination with a quantity metering device for printing computed data on a recording sheet comprising, a frame, gear means adapted to be driven by the metering device, a print wheel counter driven by said gear means to provide a registration which is proportional to the metered quantity, a carriage mounted on said frame and adapted to receive the recording sheet and position the same adjacent said print wheel counter, platen means for pressing the recording sheet against said counter to make a record of the registration, and shift lever means for sensing a control perforation in the recording sheet for automatically changing the gear means gear ratio.

7. A device as set forth in claim 6 including a gear train driven by said gear means and providing an output representing a percentage of the print wheel counter registration.

8. A device as set forth in claim 6 including shaft means responsive to rotation for moving said carriage and recording sheet relative to said print wheel counter and actuating said platen means to make at least initial and final recordings of the print wheel counter initial and final registrations each displaced from the other on said recording sheet.

9. A device as set forth in claim 8 including lever means responsive to rotation of said shaft means for releasably locking the recording sheet in said carriage.

10. A device as set forth in claim 8 including means responsive to carriage movement for advancing the print wheel counter to a full print position.

11. In a computing register, a stepped cone gear having a plurality of gear sections, a pair of gears driven by said cone gear, a counter, clutch means selectively coupling one or the other of said pair of gears with said counter, and clutch control means including an axially movable reset shaft, a member slidably received on said reset shaft and engaging said clutch means, spring means urging said member and clutch means to move in one direction on said reset shaft, latch means releasably holding said member and clutch means against movement in said one direction, and means arranged to movably engage said reset shaft for moving said member and clutch means in the direction opposite said one direction for reengagement by said latch means.

12. In a device as set forth in claim 11 including a record sheet, and spring urged lever means for sensing a control perforation in said record sheet for remotely actuating said latch means.

13. A computing register for use in combination with a quantity metering device for printing computed data on a recording sheet comprising, a stepped cone gear having a plurality of gear sections of different diameter driven by the metering device, a differential, a pair of gear trains coupling the differential with said stepped cone gear to provide an output at the differential proportional to the metered quantity, one of said gear trains including a pair of gears operatively engaging said stepped cone gear, first clutch means selectively connecting one or the other of said pair of gears in said one gear train with said differential to change the proportionality of the differential output with respect to the metered quantity, means associated with each gear train for selectively moving the same into operating engagement with any gear section on said stepped cone gear to change the proportionality of the differential output with respect to the metered quantity, a third gear train, second clutch means selectively coupling said third gear train with said differential output to provide a gear output proportional to the differential output, first counter means responsive to said gear output and providing a registration of the total gear output, second counter means coupled to said percentage gear means and providing a registration representing the total differential output, means selectively actuating both said first and second clutch means independently, a carriage supporting the recording sheet adjacent said counter means, a platen responsive to being actuated for pressing the recording sheet against said counter means to record the registrations, means advancing said counter means to a full read position including ratchet coupling means between said differential and said counter means allowing said counter means to advance relative to the differential output to a full read position, and means effecting controlled movement of said platen and counter advancing means in making a recording.

References Cited in the file of this patent
UNITED STATES PATENTS

| | | |
|---|---|---|
| 1,084,671 | Tallmadge | Jan. 20, 1914 |
| 2,079,957 | Clifton | Jan. 11, 1937 |
| 2,106,686 | Woodford | Jan. 25, 1938 |
| 2,141,015 | Paige | Dec. 20, 1938 |
| 2,189,044 | Paris | Feb. 6, 1940 |
| 2,323,373 | Bugg | July 6, 1943 |
| 2,836,361 | Haupt | May 27, 1958 |
| 2,840,312 | Vroom | June 24, 1958 |
| 2,884,852 | Saltz | May 5, 1959 |
| 2,889,985 | Ellerbeck | June 9, 1959 |
| 2,977,045 | Pandozy | Mar. 28, 1961 |
| 3,014,657 | Sargent et al. | Dec. 26, 1961 |

FOREIGN PATENTS

| | | |
|---|---|---|
| 106,038 | Sweden | Oct. 1, 1942 |
| 136,831 | Austria | Mar. 10, 1934 |
| 367,650 | Great Britain | Feb. 25, 1932 |
| 694,165 | Great Britain | July 15, 1953 |